June 22, 1954          J. W. GRAY          2,682,023

SINE-COSINE CONDENSER

Original Filed Dec. 1, 1948

Inventor
JOHN W. GRAY

Attorney

Patented June 22, 1954

2,682,023

UNITED STATES PATENT OFFICE 2,682,023

SINE-COSINE CONDENSER

John W. Gray, White Plains, N. Y., assignor to General Precision Laboratory Incorporated, a corporation of New York Original application December 1, 1948, Serial No. 62,947. Divided and this application April 5, 1951, Serial No. 219,420

7 Claims. (Cl. 317—253)

This invention relates to a variable sine-cosine condenser and more generally to a movable plate condenser having such design as to produce an electrical quantity that is a selected function of the displacement of the movable plate.

This application is a division of the copending application of John W. Gray, Serial No. 62,947, filed December 1, 1948.

The specific form that the condenser of this invention takes is that of an adjustable differential condenser so designed that as one portion is increased in capacitance the other portion is decreased in capacitance. The differential capacitance, as the condenser is adjusted, is then a selected function of the adjustment magnitude. This function may be the sine or cosine, square root, cube or cube root function, or may be any continuous repeating function that does not itself, or its first or second derivatives, go to infinity. However, the greatest utility of such a device is to generate an electrical quality proportional to the sine or cosine of the condenser adjustment, in which form the device can be employed in appropriate circuits to take the place of a sine potentiometer or of a synchro resolver.

Of the several ways of utilizing such a condenser the simplest is to supply it with a balanced alternating voltage, in which case the output voltage is then made representative of the product of the input voltage and of the selected function of the condenser adjustment. Another utility of the instant invention resides in its use as a component of a function generator in which the integrated output current is made proportional to the product of the input frequency, input voltage and the selected function of the condenser adjustment.

The purpose then of this invention is to provide a condenser for producing an electrical quality representative of a selected function.

More specifically, the purpose of this invention is to provide an adjustable differential condenser in which the differential capacitance represents a selected function of the adjustment magnitude.

Still more specifically, one purpose of this invention is to provide a variable sine/cosine condenser in which the differential capacitance is proportional to the sine or cosine of the variable adjustment magnitude.

The exact nature of the invention will be more readily apparent from the detailed description when taken together with the accompanying drawings, in which.

Figure 1:
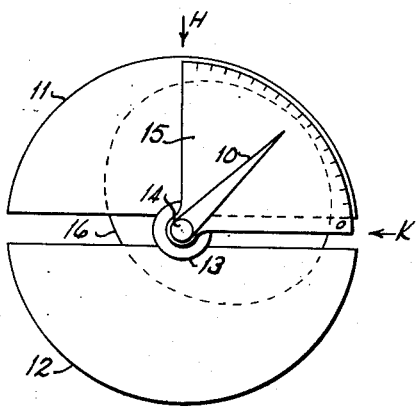
Figures 1 and 2 are front and side views of one form of condenser illustrating the invention.
Figure 2:
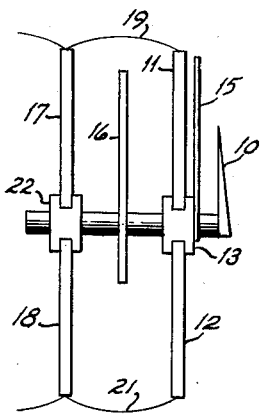

Referring now to Figs. 1 and 2, one form of function-generating condenser is shown in plan and edge view respectively, with two fixed plates 11 and 12 of approximately semicircular form, electrically insulated from each other but mechanically connected together and to support means, not shown, by a bushing 13 of insulating material. The bushing 13 carries a shaft 14 to which is fastened a rotor plate 16. The shaft also carries a pointer 10 moving over a scale inscribed on a scale plate 15. A second set of fixed plates 17 and 18, Fig. 2, similar to the fixed plates 11 and 12, are electrically connected thereto by conductors 19 and 21, and are similarly secured in a bushing 22. The rotor plate 16 is asymmetrical about its axis, so that as it rotates its differential capacitance as respects the two sets of fixed plates varies.

Obviously in place of the described condenser having fixed plates in only two planes and a single movable plate, any reasonable number of plates mechanically arranged in the conventional manner may be employed.

The manner or law of variation of the differential capacitance with adjustment of this condenser, that is, the mathematical function which it generates, is dependent upon the shape of the rotating plate 16, the fixed plates being sufficiently larger than the maximum diameter of the movable plate to eliminate fringe effects near the circular edges of the fixed plates. That is to say, $$C' - C'' = F(\theta) \quad (1)$$

in which $C'$ is the capacitance between one set of fixed plates and the movable plate when the latter is positioned at a selected value of its angular displacement $\theta$, and $C''$ is under this condition the capacitance between the other set of fixed plates and the movable plate. If the function desired is the square of the angle, Equation 1 becomes $$C' - C'' = m\theta^2 \quad (2)$$

If the function is the sine or cosine the equations are $$C' - C'' = m \sin \theta, \quad (3)$$

and $$C' - C'' = m \cos \theta \quad (4)$$

In these equations $m$ is the dimensional constant. It is obvious that the cosine condenser differs from the sine condenser in having its $\theta$ scale reversed, so that if Fig. 1 represents a cosine condenser the scale zero is at H and the 90-degree mark at K, while a sine condenser has its zero at K and its maximum scale value at H. In all other respects the cosine condenser design is exactly like that of the sine condenser.

In producing a design for the movable plate of the condenser of the invention the following procedure may be utilized to advantage.

Figure 3:
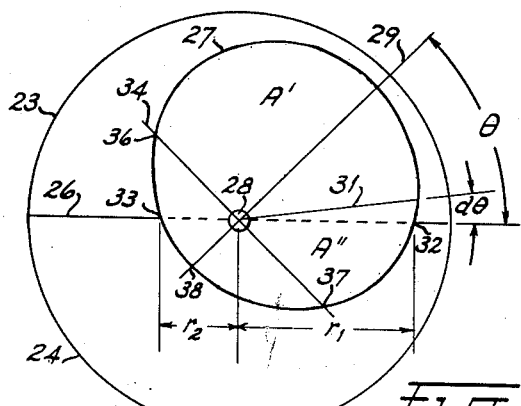
Figure 3 is a front view of the same condenser with one set of fixed plates removed to expose the movable plate.

Referring to Fig. 3 two fixed semicircular plates 23 and 24 are represented as being in the same plane and very close together, separated, say, only by an insulating strip or line 26 of infinitesimal width. Above these plates a smaller movable plate 27 is pivoted at 28 but is insulated from the fixed plates so that it has capacitance to each. Fringe effects being neglected, the operation of this differential condenser is that of a nearly ideal condenser and the shape of the rotor or movable plate 27 uniquely determines the functional relation that a selected output electrical quantity has to the angular position of the rotor 27. In this case the function is selected as being the sine and the relation is that of Equation 3. $C'$ is herein used to denote the capacitance between the fixed plate 23 and the rotor 27, and $C''$ the capacitance between plate 24 and rotor 27. The rotor 27 is designed as approaching an ellipse having major and minor axes of almost the same length, that shape having been found comfortable to the mathematical requirements while being simple to manufacture. Such simplicity of shape leads to ease of manufacture and is indeed one of the most important features of this invention. The rotor is depicted in Fig. 3 with its minor axis and shortest diameter in the direction of the radial line 29. The angle between this line and the insulating strip 26 is here termed $\theta$, and is a measure of the angular displacement of the rotor, which is the independent variable. The rotor 27 is symmetrical about its minor axis, so that, when the minor axis 29 coincides with the line 26, $C'=C''$. It is in this position that $\sin \theta = 0$, and the scale of $\theta$ must therefore be placed with its zero at the line 26.

The capacitance $C'$ between the rotor 27 and plate 23 is determined by the expression $$C' = \frac{KA'}{4.45d} \quad (5)$$

while the capacitance $C''$ between rotor 27 and plate 24 is $$C'' = \frac{KA''}{4.45d} \quad (6)$$

in which $A'$ and $A''$ are the respective areas of those portions of the rotor 27 which are superposed on the plates 23 and 24, $d$ is the dielectric thickness and $K$ is the dielectric constant of the intervening space or medium.

Since the expression $$\frac{4.45dm}{K}$$

contains no variables the constant $k$ may be used in place thereof, and combining Equations 3, 5 and 6, there is obtained $$A' - A'' = k \sin \theta \quad (7)$$

Differentiating Equation 7, the expression $$dA' - dA'' = k \cos \theta\, d\theta \quad (8)$$

is obtained.

In Fig. 3, a clockwise rotation of the rotor until the radial element 31, after moving the angular distance $d\theta$, coincides with line 26, representing a movement of the rotor through $d\theta$, increases the area $A''$ covering stator 24 by the area $$\tfrac{1}{2}r_1^2 d\theta - \tfrac{1}{2}r_2^2 d\theta$$

in which $r_1$ is the distance along line 26 from the center of rotation 28 to the edge of the plate at the point 32, and $r_2$ is the distance along line 26 from the center of rotation 28 to the edge of the plate at point 33. At the same time the movement decreases the area $A'$ by the same amount so that in Equation 8 these areas in terms of $r_1$ and $r_2$ can be substituted for $dA_1$ and $dA_2$ and the equation becomes $$r_1^2 - r_2^2 = k \cos \theta \quad (9)$$

This equation serves as the basis for the rotor curvature design. In designing the rotor utilizing this equation the term $k$ may for convenience be set equal to unity and after the rotor dimensions have been calculated based on this unity assumption, the various dimensions may be multiplied by the desired scale factor. A convenient design results if a ratio of 1 to 3 is selected for the proportion of $r_2$ to $r_1$ at $\theta=0$, although other ratios may be used if desired.

Figure 4:
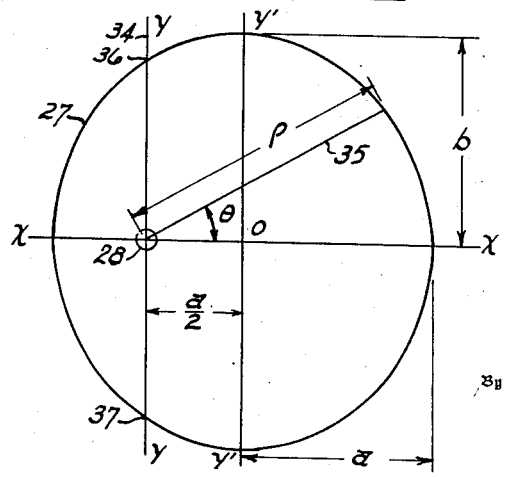
Figure 4 is a diagrammatic representation utilized as an aid in describing the procedure of designing one shape of rotor which may suitably be used in the invention.

The rotor 27 of Fig. 3 is redrawn in Fig. 4 in the approximate shape and proportions that have been found to be appropriate for the purpose. The rotor is designed to rotate about the point 28 and has approximately the form of an ellipse having the minor axis X—X and the major axis Y'—Y'. The dimensions $a$ and $b$ are conventionally termed the minor and major semiaxes, respectively. From Equation 9, inserting assumed values, $$r_1 = \frac{3}{2\sqrt{2}} \quad (10)$$

and it follows from the geometry of Fig. 4 that $$a = \frac{1}{\sqrt{2}} \quad (11)$$

It has been found satisfactory to design the portion of the rotor to the left of the pivot 28 in Fig. 4 as an ellipse, designing the remainder of the outline in accordance with Equation 9. In order to design this portion of an ellipse in terms of the dimensions $r_1$ and $r_2$ it is desirable to convert the usual equation of the ellipse, $$\frac{X^2}{a^2} + \frac{(Y')^2}{b^2} = 1 \quad (12)$$

into polar coordinates referred to the pivot point 28 as the pole, resulting in $$\frac{\left(\rho \cos \theta \frac{a}{2}\right)^2}{a^2} + \frac{\rho^2 \sin^2 \theta}{b^2} = 1 \quad (13)$$

For $b$ in this equation is substituted its value in terms of $a$ and $e$, the eccentricity, by solving the usual equation for eccentricity for $b^2$, resulting in $$b^2 = \frac{a^2}{1 - e^2} \quad (14)$$

Substituting in (13) and solving for $\rho$ gives:

$$\rho = \frac{a \cos \theta}{2(1 - e^2 \sin^2 \theta)} + \frac{1}{2}\sqrt{\frac{a^2 \cos^2 \theta}{(1 - e^2 \sin^2 \theta)^2} + \frac{3a^2}{1 - e^2 \sin^2 \theta}} \quad (15)$$

A value for $e^2$ of 0.0874 has been found to give a good design, and employing this and the selected value of $a$, values for $\rho$ are now found for all values of $\theta$ from $+90°$ through $180°$ to $-90°$. These are the values for $r_2$ and enable the portion of the figure to the left of line Y—Y to be constructed.

Equation 9 is now solved for $r_1$, becoming:

$$r_1 = \sqrt{r_2^2 + \cos\theta} \quad (16)$$

Since $r_2$ values are known over the above range of 180°, and since any value of $\rho$ representing $r_1$ is 180° distant from its conjugate value representing $r_2$, $r_1$ for all values of $\theta$ from $-90°$ through zero to $+90°$ are now computed from Equation 16, enabling all of the remainder of the periphery of the rotor to be constructed. The resulting rotor is an exact ellipse only in the periphery to the left of Y—Y, but obeys Equation 9 at all points of its periphery and therefore is suitable for use as the rotor of a sine-generating condenser.

Figure 5:
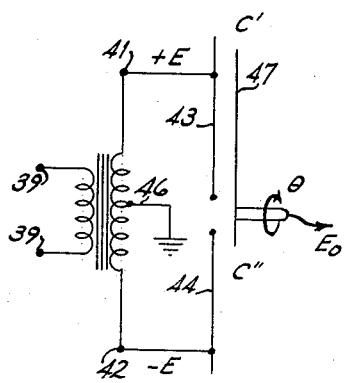
Figure 5 depicts a circuit for utilizing the condenser of the invention.

Of the many circuits for utilization of the condenser of the invention a very simple one is selected as example and is illustrated in Fig. 5. In this figure a transformer having its primary winding terminals 39—39 connected to a source of alternating current power has its secondary winding end terminals 41 and 42 connected to the fixed plates 43 and 44 of a differential condenser. At any instant then the potential of the terminal 41 is equal and opposite to that of terminal 42 with respect to the winding midpoint 46. Thus at a selected instant when the potential of the terminal 41 is $+E$, the potential of terminal 42 is $-E$, and balanced potential is thus applied to the two plates. The quantity of charge $Q'$ upon the movable plate 47 applied through plate 43 is $$Q' = C'E \quad (17)$$

in which $C'$ is the capacitance of the condenser having plates 43 and 47. Similarly, $$Q'' = -C''E \quad (18)$$

in which $Q''$ is the quantity of charge applied to plate 47 through plate 44 and $C''$ is the capacitance of the condenser having plates 44 and 47. The sum $Q_T$ is $$Q_T = Q' + Q'' = C'E - C''E \quad (19)$$

and the output voltage $E_0$ that appears on plate 47 is $$E_0 = \frac{Q_T}{C_T} \quad (20)$$

$C_T$ being the total capacitance, so that $$C_T = C' + C'' \quad (21)$$

Substituting in Equation 20

$$E_0 = \frac{C'E - C''E}{C' + C''} = E\frac{C' - C''}{C' + C''} \quad (22)$$

Since in such a condenser the total capacitance $C' + C''$ is constant at all angles, Equation 22 shows that the output voltage is proportional to the product of the input voltage and the differential capacitance at any condenser setting. If now the condenser be designed to develop the sine function, then Equation 22 is combined with Equation 3 to form $$E_0 = E p \sin\theta \quad (23)$$

$p$ being equal to $$\frac{M}{C' + C''}$$

The result of such a substantial separation of the sets of fixed plates as is shown in Fig. 1 is to introduce an error in the use of the given design Equation 9 which error, however, can easily be neutralized by empirical changes in design. Another way in which this edge error can be minimized is by making the edge separation very small. One procedure for doing this is to manufacture the two plates lying in the same plane of a single sheet of glass, metal plated, scribing a narrow line opening between them along a diameter to form two electrically separate plated sheets.

What is claimed is:

1. A rotary variable flat plate electrostatic differential condenser comprising a first set of plates electrically and mechanically constituting a unit, a second set of plates electrically and mechanically constituting a unit, a third set of plates electrically and mechanically constituting a unit and smaller in area than either of said first and second set of plates of a shape such that the difference between the squares of the lengths of the two radii displaced 180° as respects each other is proportional to a function of the angle between said radii and the minor axis of said plate, means comprising an axial member for relative rotational motion between said third set and said first and second sets, whereby change of capacitance in one sense between said third and first sets is accompanied by change of capacitance in the opposite sense between said third and second sets.

2. A device according to claim 1 in which said function of the angle is the angle itself.

3. A device according to claim 1 in which said function of the angle is the cosine.

4. A variable condenser comprising, a first series of fixed plates, a second series of fixed plates respective ones of which are positioned in the same planes as respective ones of said first series but electrically separate therefrom, at least one rotor plate in capacitive relation with both said series of fixed plates, said rotor plate having a peripheral configuration such that $$r_1^2 - r_2^2 = f(\theta)$$

where $r_1$ is the distance taken along any line passed through the center of rotation of said rotor from said center of rotation to the periphery of said rotor in one direction, $r_2$ is the distance from said center of rotation to the periphery of said rotor taken in the opposite direction along said line, and $\theta$ is the angle of said line with respect to an arbitrary reference.

5. A variable condenser comprising, a first series of fixed plates, a second series of fixed plates respective ones of which are positioned in the same planes as respective ones of said first series but electrically separate therefrom, at least one rotor plate in capacitive relation with both said series of fixed plates, said rotor plate having a peripheral configuration such that $$r_1^2 - r_2^2 = k\cos\theta$$

where $r_1$ is the distance taken along any line passed through the center of rotation of said rotor from said center of rotation to the periphery of said rotor in one direction, $r_2$ is the distance from said center of rotation to the periphery of said rotor taken in the opposite direction along said line, $\theta$ is the angle of said line with respect to an arbitrary reference and $k$ is a constant.

6. A variable differential condenser comprising, at least one fixed plate, at least one other fixed plate lying in the same plane as said first mentioned fixed plate and having an edge closely contiguous along its length to an edge of said first fixed plate, a rotor comprising at least one plate mounted with its center of rotation coinciding with the contiguous edges of said fixed plates, the lateral expanse of said rotor being less than the combined lateral expanse of said fixed plates and said rotor having a peripheral configuration such that $$r_1^2 - r_2^2 = f(\theta)$$

where $r_1$ is the distance from the center of rotation of said rotor to the periphery thereof taken in one direction along the contiguous edges of said fixed plates, $r_2$ is the distance from said center of rotation to the periphery of said rotor taken in the opposite direction along said contiguous edges, and $\theta$ is the angle of rotation of said rotor taken from said contiguous edges.

7. A variable differential condenser comprising, at least one fixed plate, at least one other fixed plate lying in the same plane as said first mentioned fixed plate and having an edge closely contiguous along its length to an edge of said first fixed plate, a rotor comprising at least one plate mounted with its center of rotation coinciding with the contiguous edges of said fixed plates, the lateral expanse of said rotor being less than the combined lateral expanse of said fixed plates and said rotor having a peripheral configuration such that, $$r_1^2 - r_2^2 = k \cos \theta$$

where $r_1$ is the distance from the center of rotation of said rotor to the periphery thereof taken in one direction along the contiguous edges of said fixed plates, $r_2$ is the distance from said center of rotation to the periphery of said rotor taken in the opposite direction along said contiguous edges, $\theta$ is the angle of rotation of said rotor taken from said contiguous edges, and $k$ is a constant.

References Cited in the file of this patent

UNITED STATES PATENTS

| Number | Name | Date |
| --- | --- | --- |
| 1,616,622 | Horton | Feb. 8, 1927 |
| 1,620,020 | Hardy | Mar. 8, 1927 |
| 2,200,863 | Schuck | May 14, 1940 |
| 2,386,651 | Bisson | Oct. 9, 1945 |
| 2,461,832 | Meacham | Feb. 15, 1949 |
| 2,480,187 | Gamertsfelder | Aug. 30, 1949 |
| 2,519,773 | Lee | Aug. 22, 1950 |
| 2,526,595 | Watts | Oct. 17, 1950 |